United States Patent [19]
Herbert

[11] Patent Number: 5,644,336
[45] Date of Patent: Jul. 1, 1997

[54] MIXED FORMAT VIDEO RAM

[75] Inventor: Brian K. Herbert, Colorado Springs, Colo.

[73] Assignees: AT&T Global Information Solutions Company, Dayton, Ohio; Hyundai Electronics America, San Jose, Calif.; Symbios Logic Inc., Collins, Colo.

[21] Appl. No.: 355,413

[22] Filed: Dec. 12, 1994

Related U.S. Application Data

[63] Continuation of Ser. No. 64,518, May 19, 1993, abandoned.
[51] Int. Cl.$^6$ .................. G09G 5/04; G09G 5/36
[52] U.S. Cl. .............. 345/154; 345/189; 395/806; 348/716
[58] Field of Search ................ 345/153, 154, 345/155, 186, 187, 188, 113, 115, 116, 199, 118, 119, 120, 132, 189, 190, 196, 201, 203; 395/154, 157, 163, 164; 348/589, 600, 716; H04N 5/272, 5/275, 5/278, 9/64

[56] References Cited

U.S. PATENT DOCUMENTS

| | | |
|---|---|---|
| 3,955,189 | 5/1976 | Thomson . |
| 4,131,883 | 12/1978 | Lundstrom . |
| 4,231,021 | 10/1980 | Clark et al. . |
| 4,704,697 | 11/1987 | Kiremidjian et al. . |
| 4,712,099 | 12/1987 | Maeda . |
| 4,727,362 | 2/1988 | Rackley et al. . |
| 4,773,026 | 9/1988 | Takahara et al. . |
| 4,796,203 | 1/1989 | Roberts . |
| 4,808,989 | 2/1989 | Tabata et al. ............ 345/190 |
| 4,862,150 | 8/1989 | Katsura et al. . |
| 4,945,499 | 7/1990 | Asari et al. . |
| 4,979,738 | 12/1990 | Frederiksen . |
| 5,043,714 | 8/1991 | Perlman . |
| 5,124,688 | 6/1992 | Rumball .............. 345/154 |
| 5,138,307 | 8/1992 | Tatsumi ................ 345/115 |
| 5,241,658 | 8/1993 | Masterson et al. ........ 345/155 |
| 5,243,447 | 9/1993 | BodenKamp et al. ...... 348/589 |
| 5,274,753 | 12/1993 | Roskowski et al. ....... 395/154 |
| 5,396,263 | 3/1995 | Seiler et al. ............ 345/115 |
| 5,406,306 | 4/1995 | Siann et al. ............ 348/589 |
| 5,473,342 | 12/1995 | Tse et al. .............. 345/132 |

Primary Examiner—Richard Hjerpe
Assistant Examiner—Kara Farnandez Stoll
Attorney, Agent, or Firm—Wayne P. Bailey; Douglas S. Foote

[57] ABSTRACT

The invention concerns the simultaneous display of video data and text data on a computer display. The invention stores both types of data in display memory. Transition codes mark the separation between the two types. The invention converts each type of data into signals which a CRT display can understand. The invention changes the type of conversion, as appropriate, when transition codes are reached.

7 Claims, 19 Drawing Sheets

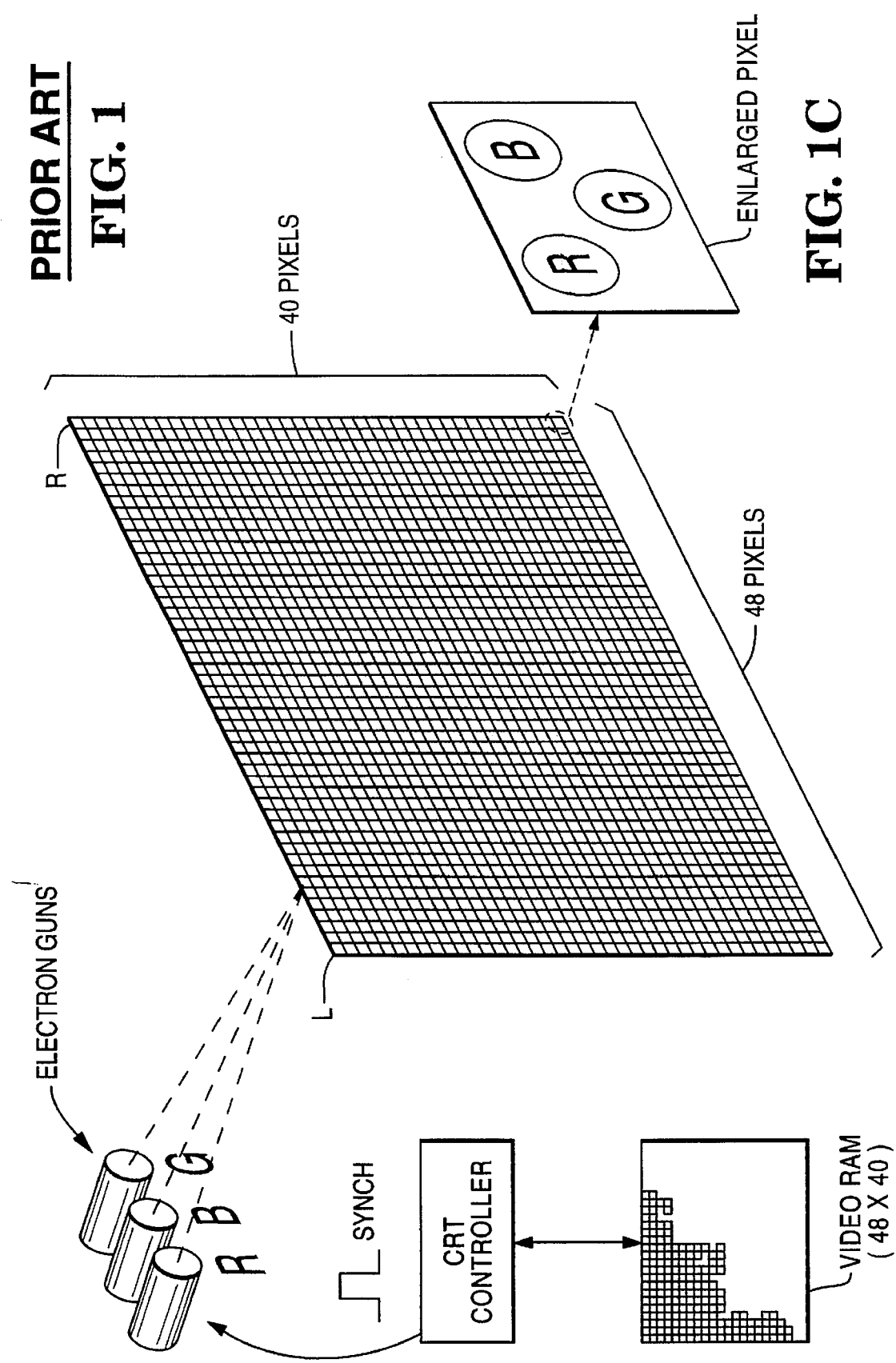

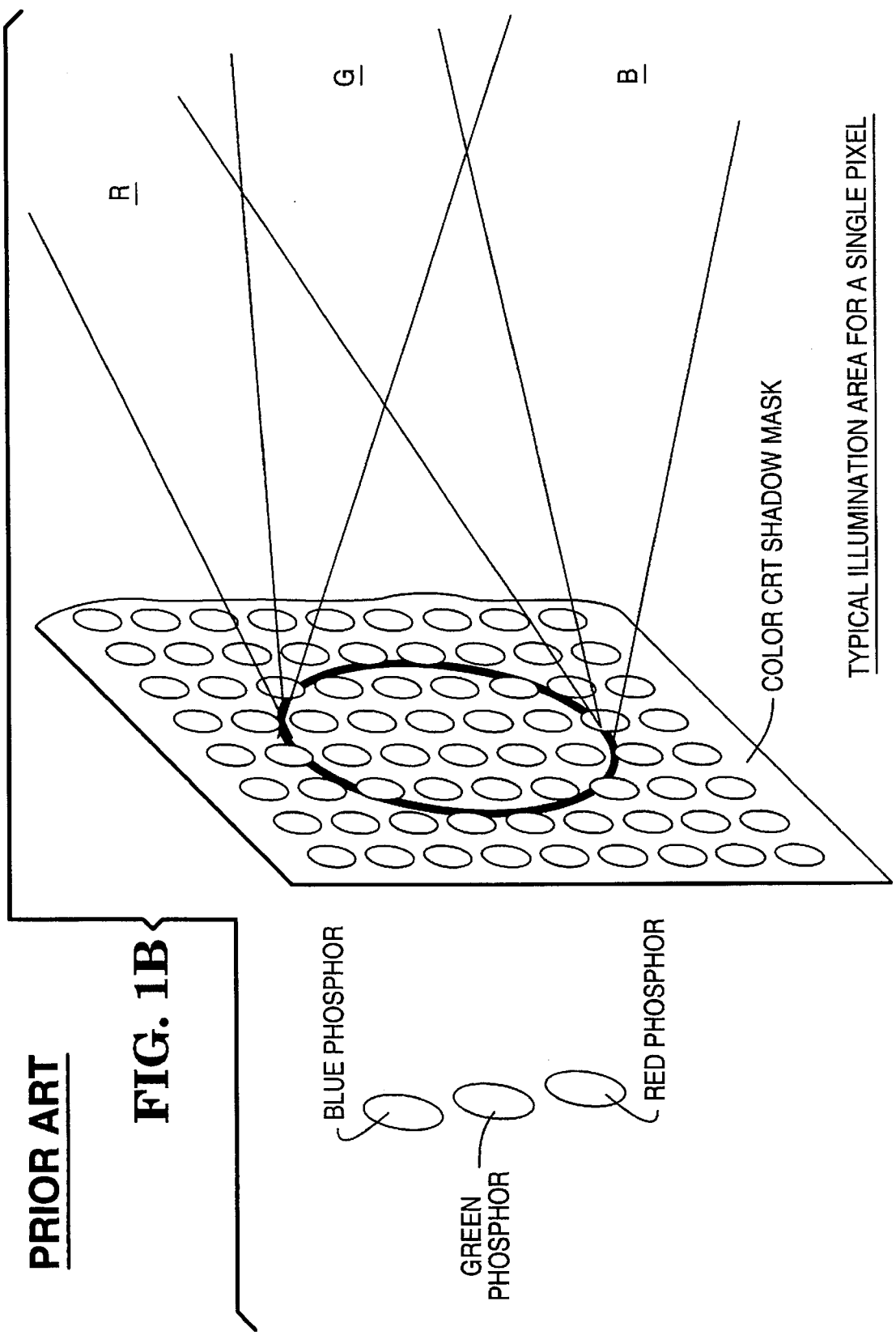

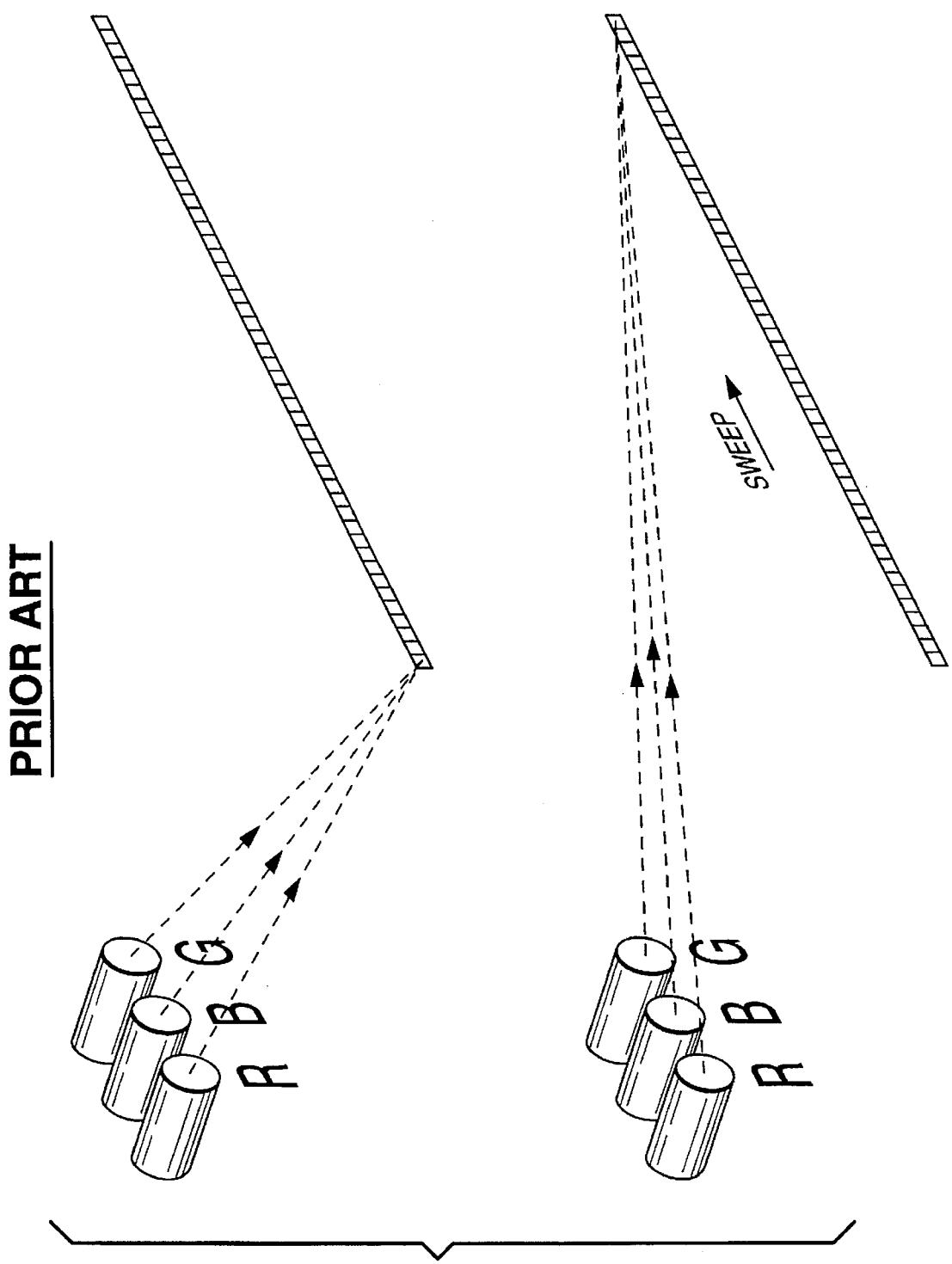

PRIOR ART FIG. 4
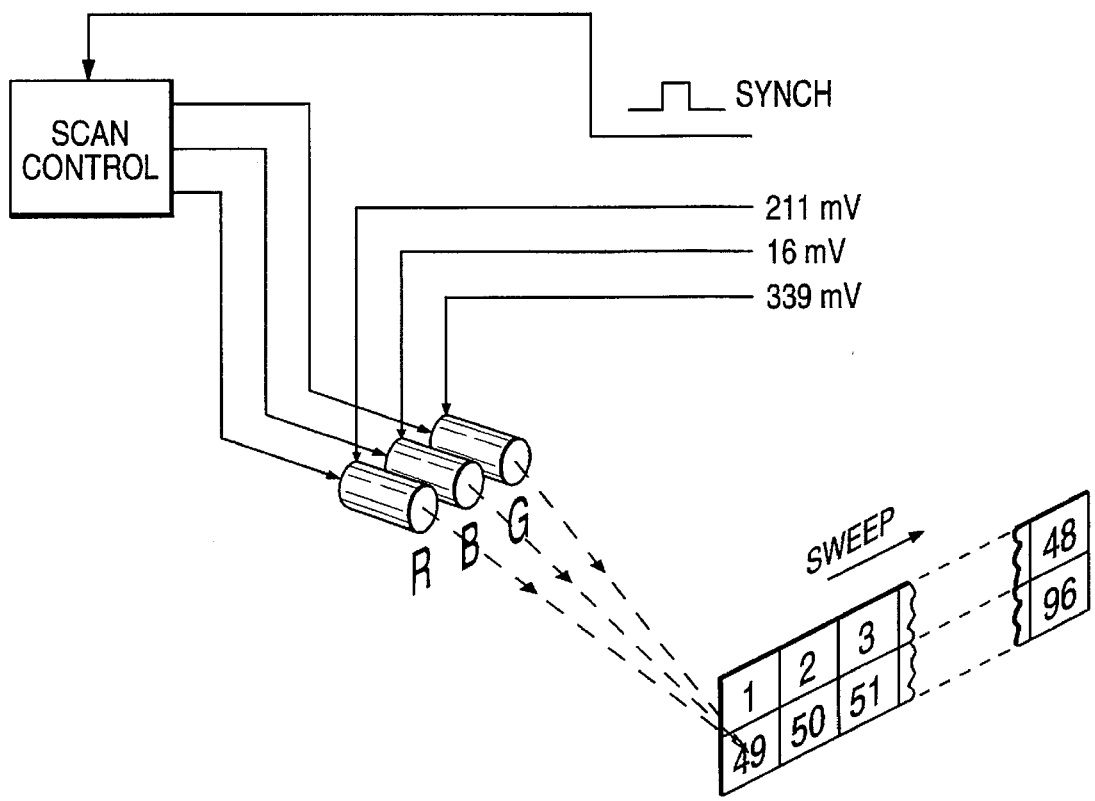
PRIOR ART
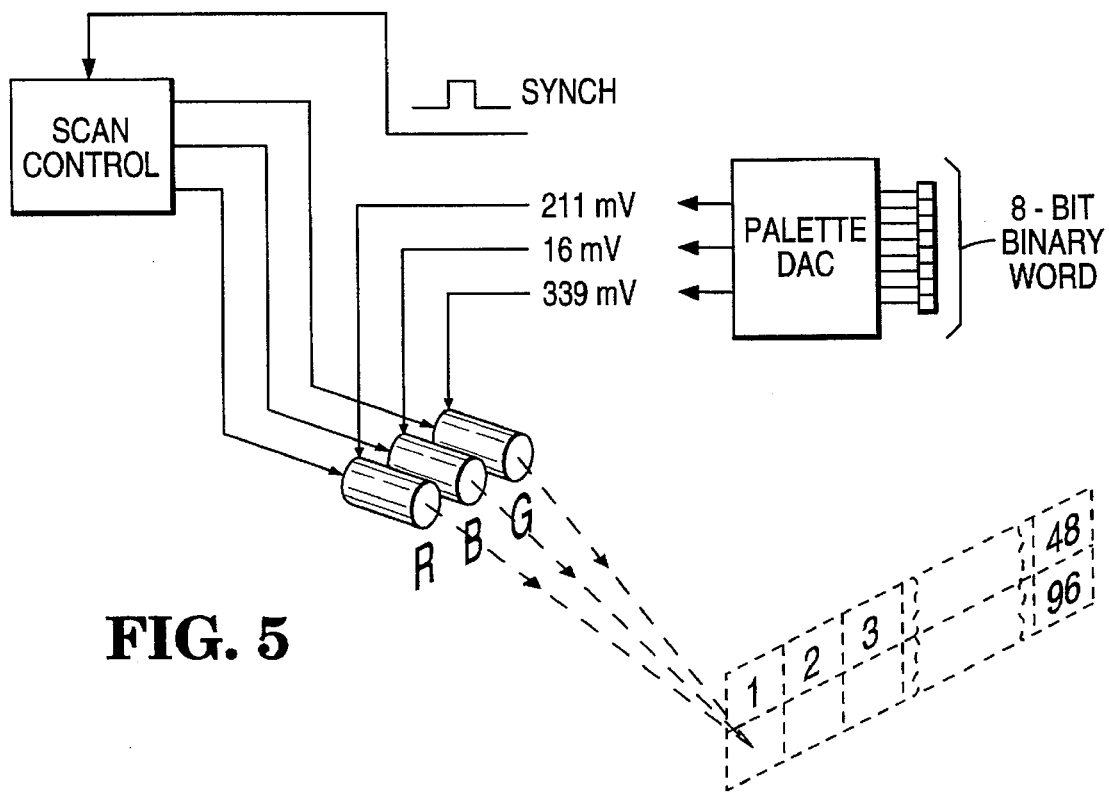
FIG. 5

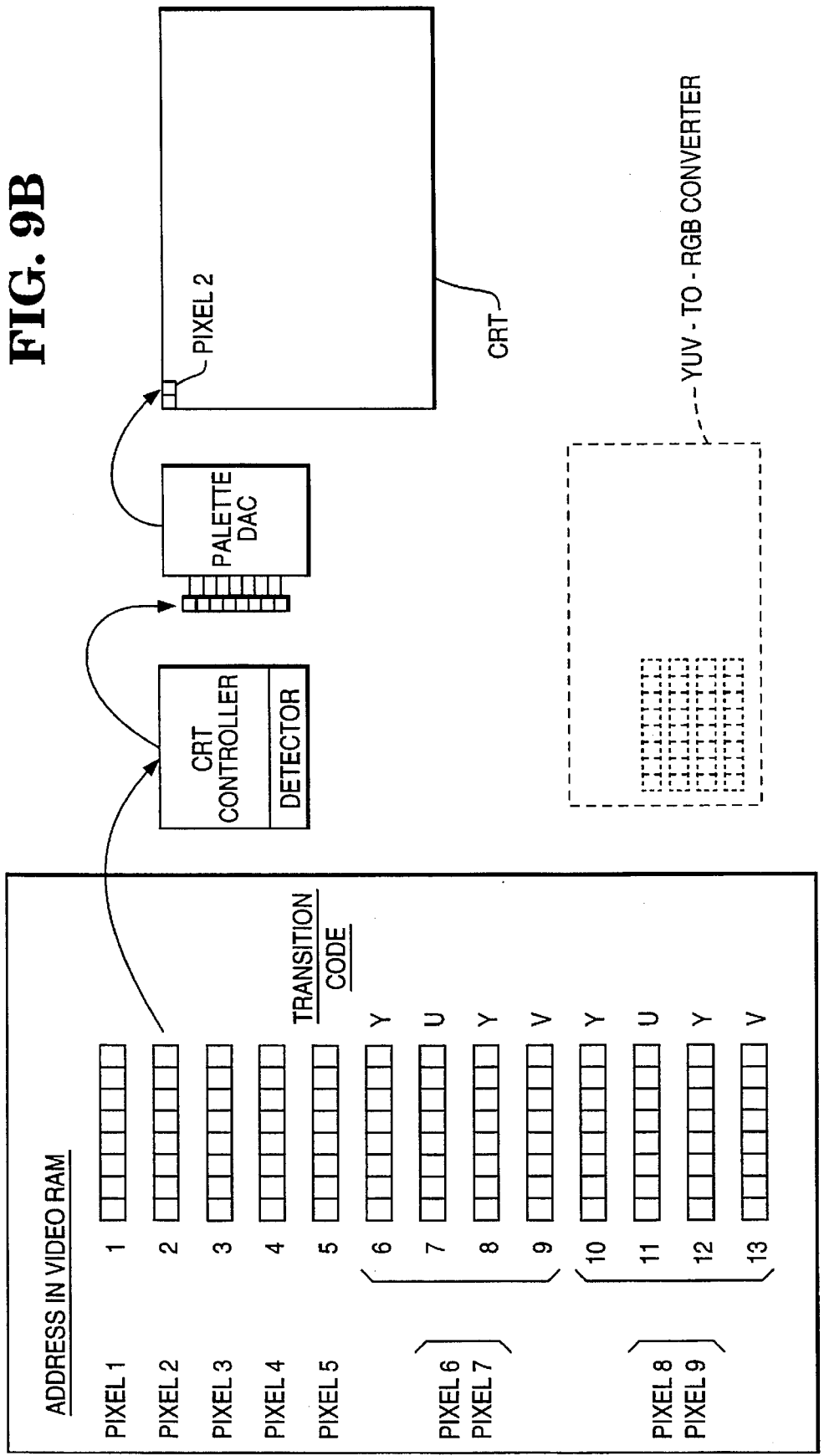

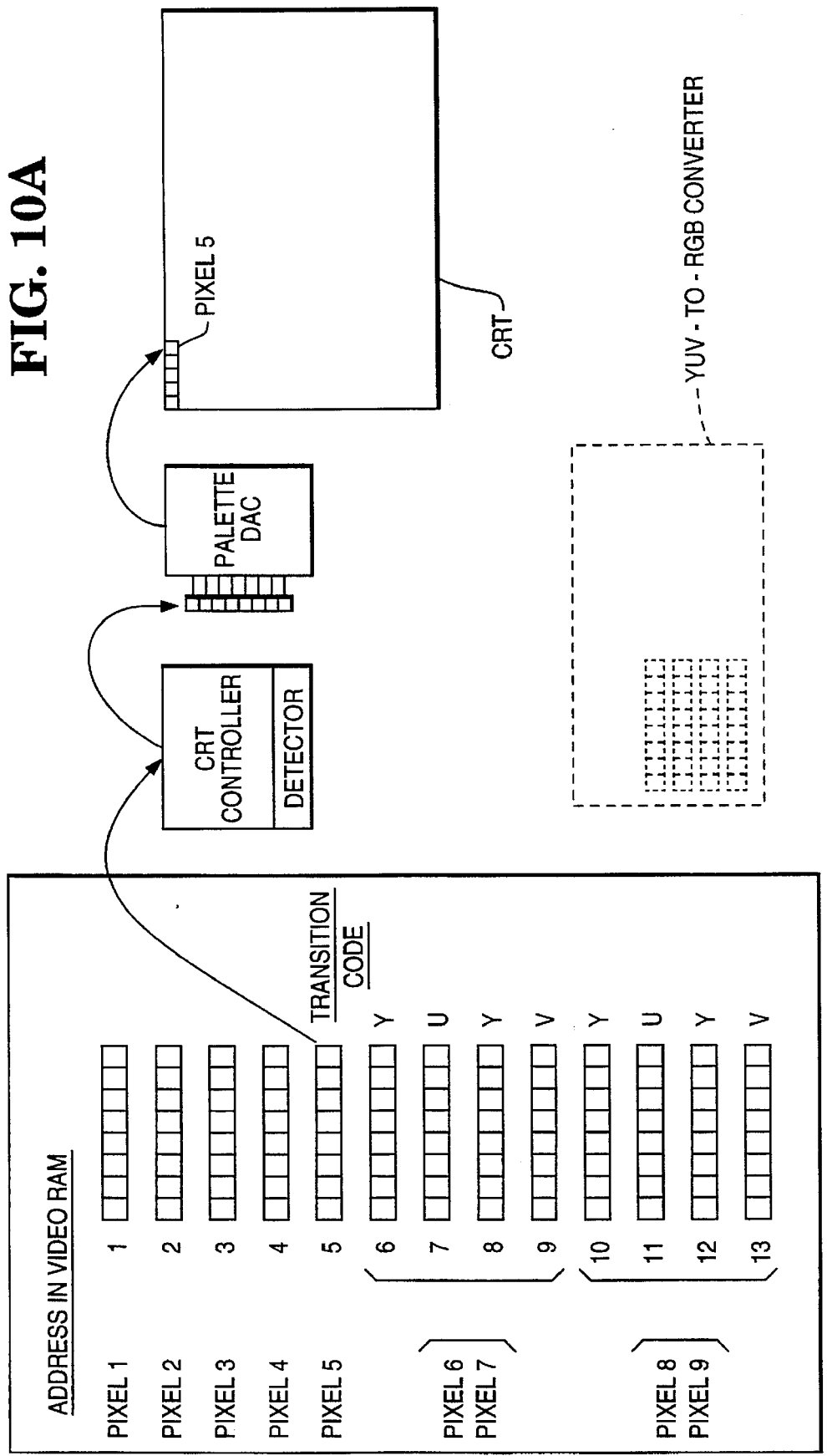

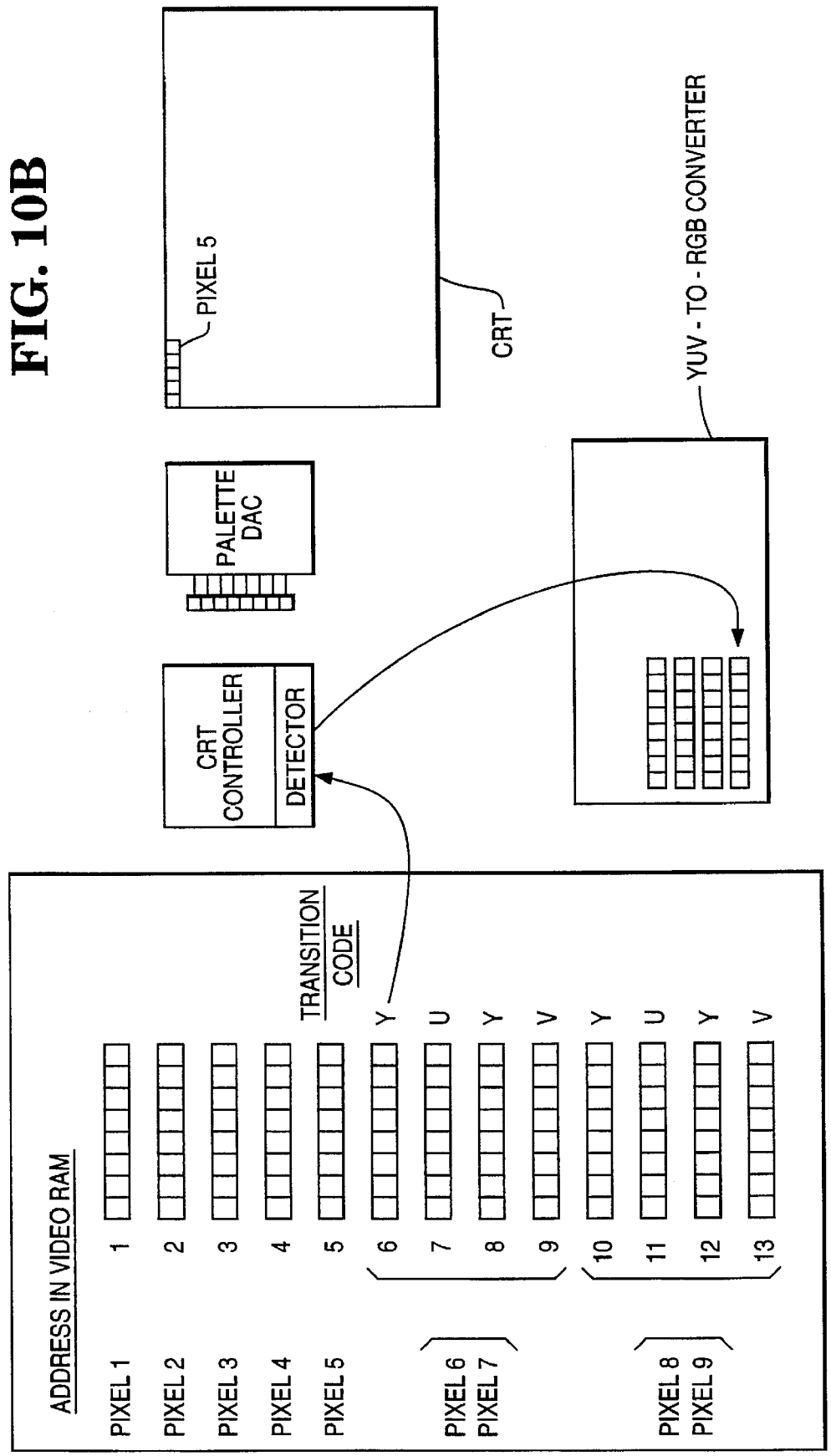

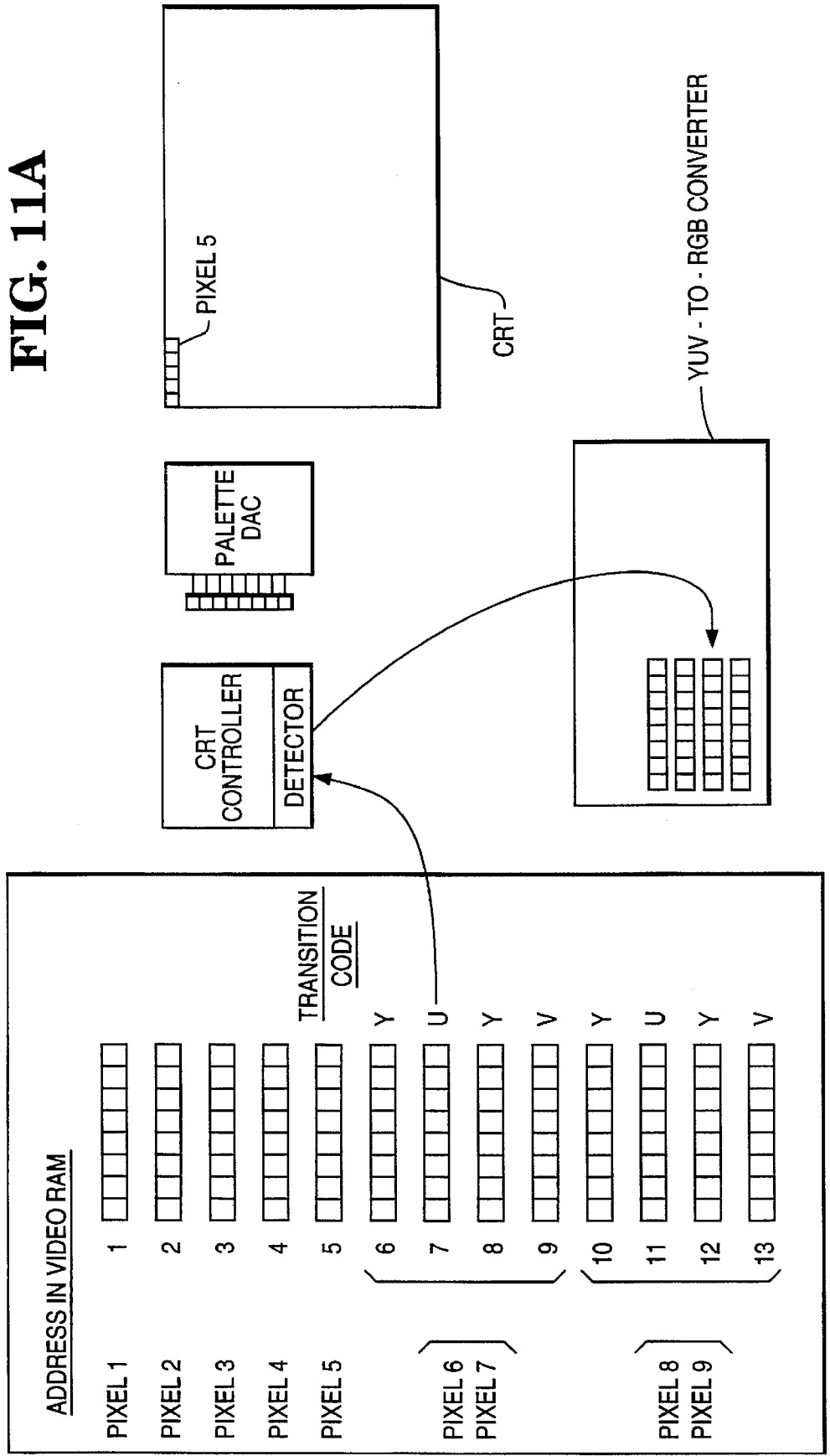

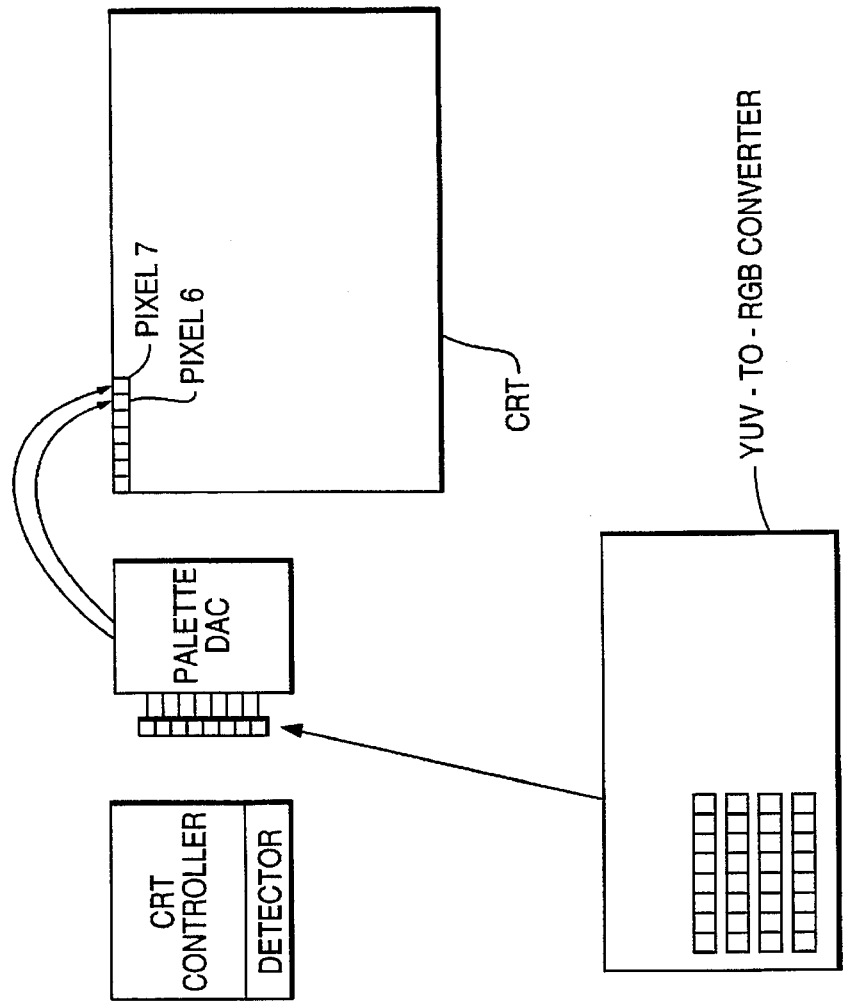
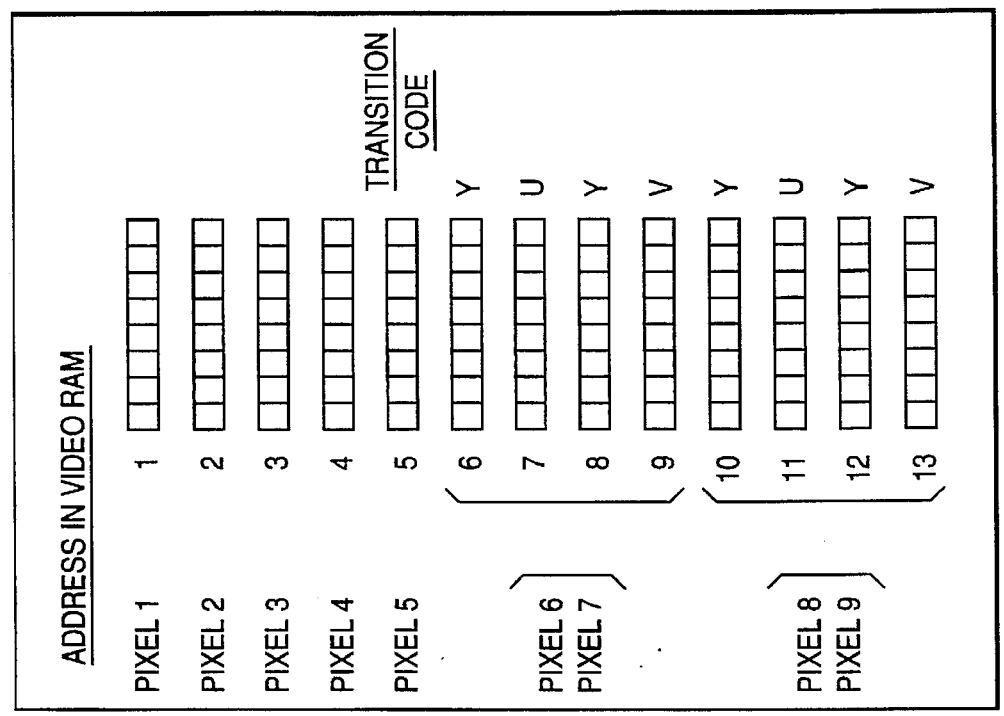
FIG. 12B

MIXED FORMAT VIDEO RAM

This is a continuation of application Ser. No. 08/064,518 filed May 19, 1993 now abandoned.

The invention concerns the simultaneous display of different types of data on a common video display. As an example, text data, generated by a computer, can be displayed at one location, while a television image, generated by a CD-ROM, can be displayed at another.

BACKGROUND OF THE INVENTION

Overview

In almost all of today's computer systems, the image displayed on the screen is stored in a DISPLAY MEMORY, which is also called VIDEO RAM, as in FIG. 1. In DISPLAY MEMORY, there is a memory location for each pixel on the screen. Each memory location can consist of one bit, or several bits. The greater the number of bits for each pixel, the more information can be associated with each pixel. Basically, this information specifies color and brightness of the pixel.

There are numerous different conventions for storing color and brightness information in DISPLAY MEMORY. Computer systems commonly store information as to the red, green, and blue content of each pixel. In contrast, television formats use a different approach.

In general, the television formats, even if their data is in digital format, are incompatible with computer formats. They cannot merely be loaded into a DISPLAY MEMORY in a computer.

For example, in the NTSC system, four bytes of data specify the characteristics of two adjacent pixels. Two of the bytes are used are used to specify color and tint (which are identical for the two adjacent pixels). The two remaining bytes are used to specify intensity, which is different for the two pixels.

This approach reduces the amount of data required, because the color/tint data for the two pixels is transmitted at half the frequency of the intensity data. (This has been found practical because the human eye is less sensitive to color than to intensity.)

The invention seeks to display images of both formats ("computer format" and "television format") on a single computer screen, at the same time. However, the display hardware expects signals following a particular, single format. Thus, for display of dual formats, one format must be translated into another, to attain compatibility with the display.

In the prior art, various external translation systems have been used. These prior art approaches are expensive.

Overview

FIG. 1 illustrates a hypothetical Cathode Ray Tube (CRT) video display containing an array of 48×40 pixels. (Actual displays contain a much larger number of pixels. Sizes of 640×480 and larger are common.) Each pixel contains three phosphors, namely, a red (R), a blue (B), and a green (G), as indicated in the enlarged pixel. Each phosphor has a respective electron gun 5. The electron guns spray their phosphors with electrons, causing the phosphors to emit light.

To display an image on the CRT, a CRT CONTROLLER issues a horizontal "synch" (or synchronization) pulse, which causes the electron guns to sweep the spray of electrons from left (L) to right (R) across a row of pixels. During the sweep, the spray traverses each pixel in the row.

Each pixel has an associated memory address in video memory, labeled DISPLAY MEMORY. (RAM: Random Access Memory.) Each memory address contains three pieces of information, or three intensities, one for each phosphor in a pixel.

During the sweep, the CRT CONTROLLER does the following:

1. It obtains the three pieces of information, by reading each DISPLAY MEMORY address for the swept row.
2. For each DISPLAY MEMORY address (and thus for each pixel), it formulates three voltages, based on the three pieces of information.
3. It applies the voltages to the electron guns, in synchrony with the sweep of the electron spray, to deliver the proper intensities of electron beams to each pixel.

The following discussion will elaborate this Overiew in greater detail, in order to define issues and problems which the invention addresses.

Greater Detail

Three Phosphors in Each Pixel Three Electron Guns

FIG. 1 illustrates a video display having 48 columns by 40 rows of pixels. As indicated by the ENLARGED PIXEL, each pixel contains a red (R), a blue (B), and a green (G) phosphor. A more accurate depiction of a CRT is given in FIGS. 1A and 1B, which are considered self-explanatory.

Three electron guns 5 project three respective beams of electrons to the pixels. One beam actuates the red (R) phosphors, one beam actuates the blue (B) phosphors, and one beam actuates the green (G) phosphors. The three actuated phosphors together produce a particular color of the visible spectrum. The particular color produced depends on the relative intensities of the R, G, and B phosphors.

Electron Guns Scan the Pixels

Electron Guns Require Analog Voltage Signals

The electron beams scan the pixels in each row, as shown in FIG. 2. FIG. 3 illustrates the events occurring during the scan of one row of pixels. First, a synch signal in FIG. 3A is delivered to a SCAN CONTROL (located within the CRT itself, and not separately shown), which initiates a sweep of the electron beams from pixel 1 to pixel 48.

Next, during the sweep, the electron guns move their beams from pixel to pixel, spraying the three phosphors in each pixel with electrons of a specified intensity. A control system (not shown) controls the intensities, by controlling the three ANALOG VOLTAGES delivered to the electron guns.

Each ANALOG VOLTAGE controls the intensity of the electron beam produced by its gun, and thus controls the brightness of the corresponding phosphor in the pixel presently sprayed with electrons. The analog voltages range from zero to 1.0 volts. Zero volts corresponds to zero intensity; 1.0 volts corresponds to 100% intensity.

For example, with the ANALOG VOLTAGES shown in FIG. 3A, the red phosphor in PIXEL 1 is illuminated at 46.6 percent of maximum intensity, the blue phosphor is illuminated at 23.3 percent, and the green phosphor is illuminated at 80 percent. The three phosphors together produce a color which is a combination of these three intensities of red, blue, and green.

Next, three new voltages are transmitted to the guns, for PIXEL 2. The process continues for PIXELs 3 through 48, as indicated in FIGS. 3C and 3D.

This process repeats, row by row. FIG. 4 shows the initiation of the sweep of the second row, starting with pixel 49.

Analog Voltage Signals are Derived From Digital Words Using Palette DAC

The ANALOG VOLTAGES of FIG. 3 are derived from data stored in DISPLAY MEMORY. However, the latter data is stored in binary form. For example, a given address in DISPLAY MEMORY may contain the binary number 0101 1100. This single binary number must be converted to the three analog voltages described above. This conversion is performed by a PALETTE DAC in FIG. 5. DAC is an acronym for Digital-to-Analog Conversion. The PALETTE DAC performs two important functions: a translation function, and a digital-to-analog conversions function.

As to the translation function, the PALETTE DAC converts the eight-bit binary word received from DISPLAY MEMORY into three six-bit binary words. FIG. 6 illustrates this conversion, or translation.

How Palette DAC Translates

Each eight-bit word read from DISPLAY MEMORY can range across 256 different possibilities, running from 0000 0000 to 1111 1111. The left column in the PALETTE LOOK-UP illustrates these possibilities. The PALETTE DAC contains a table which associates an eighteen-bit word with each of the 256 possibilities, as the three columns beneath the letters R, G, and B indicate.

Each eighteen-bit word contains three six-bit words. The three six-bit words each specify the intensities of one of the three electron guns. A digital-to-analog converter D/A converts the six-bit words into analog voltages.

Thus, the PALETTE DAC converts each binary word (eight bits long) received DISPLAY MEMORY into three analog voltages for the electron guns. Each analog voltage is based on a six-bit word.

The conversion from an eight-bit word into an eighteen-bit word serves to increase the dynamic range of the analog voltage fed to the electron guns. An example will illustrate.

DISPLAY MEMORY contains eight-bit words. Assume, in a primitive system, that six of these bits are used to produce the ANALOG VOLTAGES, two bits for each gun. Assume that the remaining two bits are not used. Thus, each electron gun will receive an ANALOG VOLTAGE corresponding to the two-bit binary number 00, 01, 10, or 11. The resulting ANALOG VOLTAGES are either zero, X, 2X, or 3X. If X equals 0.3, the choices of ANALOG VOLTAGES available are zero, 0.3. 0.6, or 0.9.

In general, it is not desirable that the ANALOG VOLTAGES be fixed at these ratios (namely, 3:6:9 or, equivalently, 1:2:3). Greater variability in the ANALOG VOLTAGES is desired. The PALETTE DAC provides this greater variability.

The PALETTE DAC provides greater variability because it can be programmed to assign any eighteen-bit word to a given input word, which is read from DISPLAY MEMORY. (The input words are shown in the column labeled PALETTE DAC INPUT in FIG. 6.) There are $2^{18}$ possible eighteen-bit words. Consequently, each eight-bit input word (read from DISPLAY MEMORY) can be assigned one of $2^{18}$ possible values. Restated, by using the PALETTE DAC, for each pixel, the user can select 256 different colors, because the user can select 256 possible eight-bit words. But each of the 256 colors can, by programming the PALETTE DAC, be selected from a range of $2^{18}$ colors, which is about 260,000 colors.

The preceding discussion was based on the RGB system: three ANALOG VOLTAGES, each corresponding to an R, B, or G phosphor, are fed to the CRT. A single eight-bit word contained in DISPLAY MEMORY creates each triplet of three ANALOG VOLTAGES.

Other Video Formats Exist Which are Different

A problem arises when the video image is stored in a different format. For example, a commonly used format in CD-ROMs is called "YUV" format. In YUV format, each pixel requires two bytes, as indicted in FIG. 7, rather than a single byte, as in the examples above. Further, in the YUV system, the bytes are shared between adjacent pixels. That is, the "U" and the "V" bytes together specify a common color and tint for the adjacent pixels: the adjacent two pixels are given the same color and tint.

But the two "Y" pixels specify two different intensities for the two pixels: the intensities of the two bytes are different. (As stated above, this approach is feasible because it has been found that the human eye is less sensitive to color than to intensity.)

Clearly, a conversion must be made between the YUV format and that needed by the RGB system.

The preceding discussion is a simplification. In advanced computer displays, there are three bytes associated with each pixel: one for red, one for blue, and one for green. Thus, the YUV approach is more efficient than the RGB approach in such systems.

OBJECTS OF THE INVENTION

It is an object of the invention to provide an improved video display system.

It is a further object of the invention to provide a video display system which can display images, on a common screen, which are stored in different video formats.

It is a further object of the invention to provide a system wherein both RGB and YUV data are stored in the same DISPLAY MEMORY, and wherein a control system detects which of the data are being used at a given time, so that conversion circuitry can properly convert the data.

SUMMARY OF THE INVENTION

In one form of the invention, a TRANSITION CODE is stored in DISPLAY MEMORY. The TRANSITION CODE indicates a transition from video data of one type, to video data of another type.

A detector looks for the TRANSITION CODE while a video controller generates a video image, based on data in the DISPLAY MEMORY. When the TRANSITION CODE is found, the video controller begins generating the video image based on data which is in a different format, and possibly at a different location.

BRIEF DESCRIPTION OF THE DRAWINGS

FIG. 1 illustrates a CRT display.

FIGS. 1A through 1C illustrate the layout of phosphors, and the masking, in a CRT.

FIG. 2 illustrates how electron guns in the CRT sweep across a row of pixels.

FIG. 4 illustrates the beginning of the sweep of a second row of pixels.

FIG. 5 illustrates a PALETTE DAC, which receives an eight-bit word from DISPLAY MEMORY, and translates it into three ANALOG VOLTAGEs, of the type shown in FIG. 3.

FIGS. 9–12 illustrate how a video image is generated based on the data within the common memory space of FIG. 8.

DETAILED DESCRIPTION OF THE INVENTION

Simplified View

Figure 8:
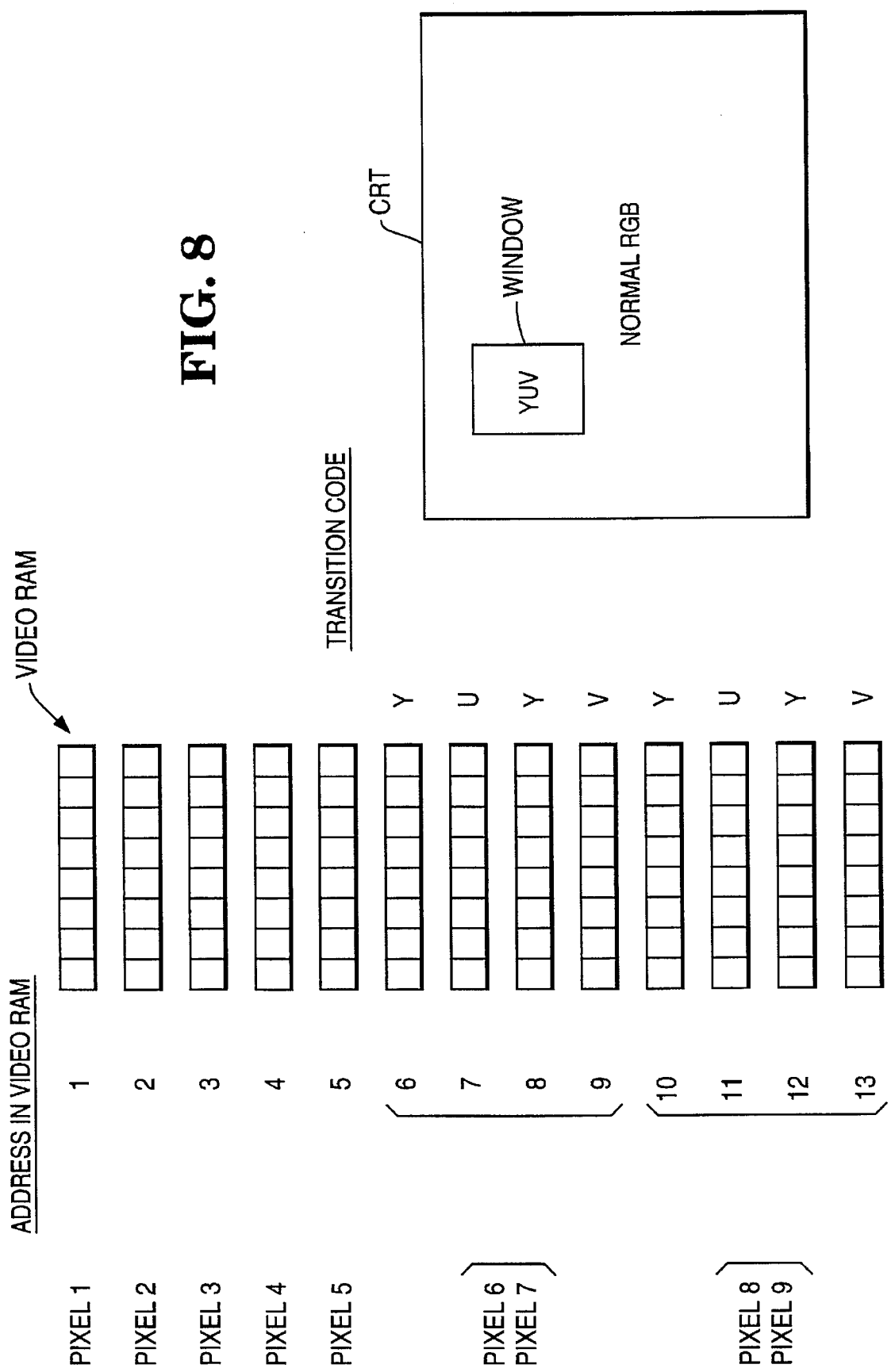
FIG. 8 illustrates how YUV data and RGB data can both occupy a common memory space.
Figure 9A:
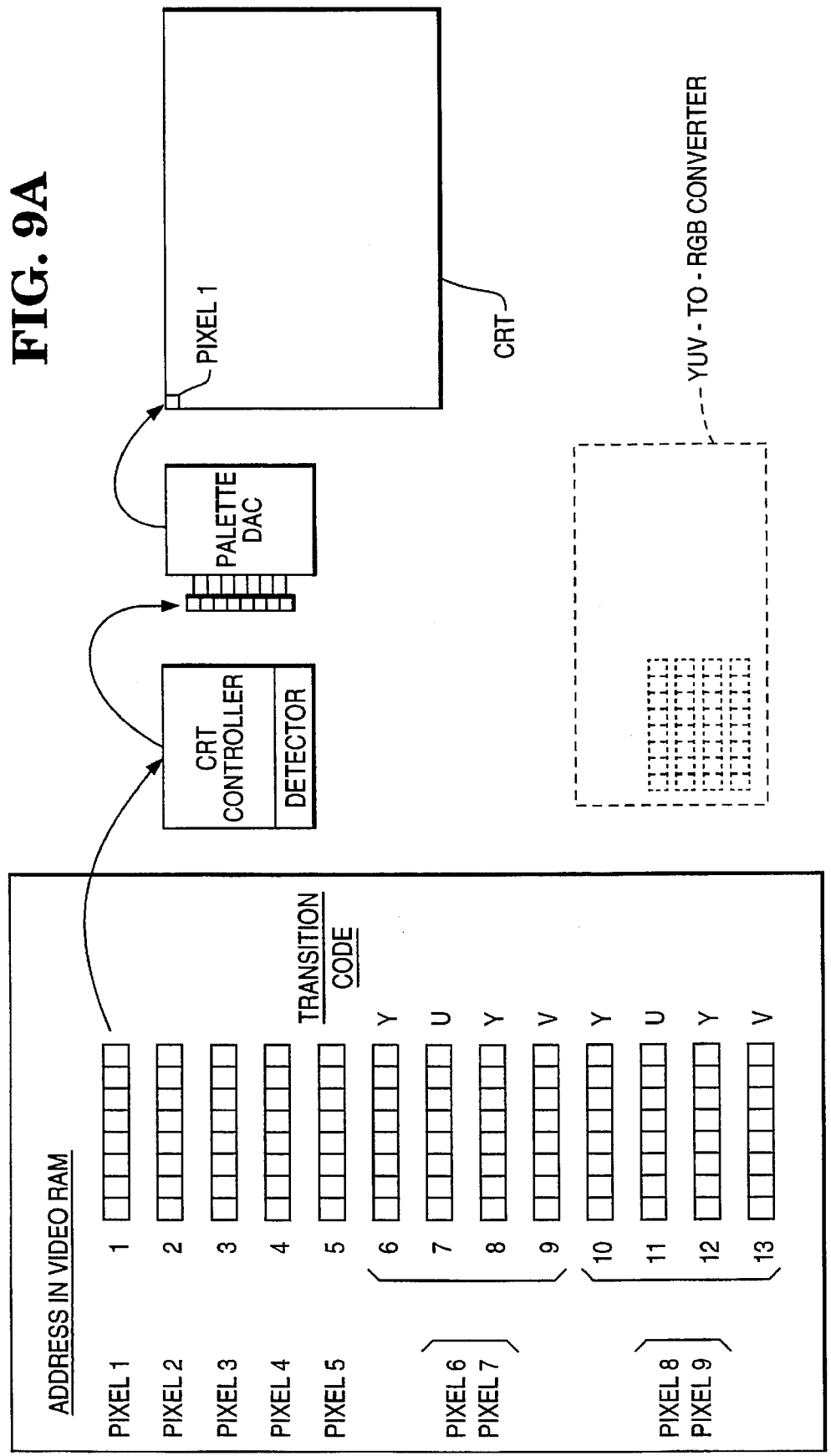
Figure 11B:
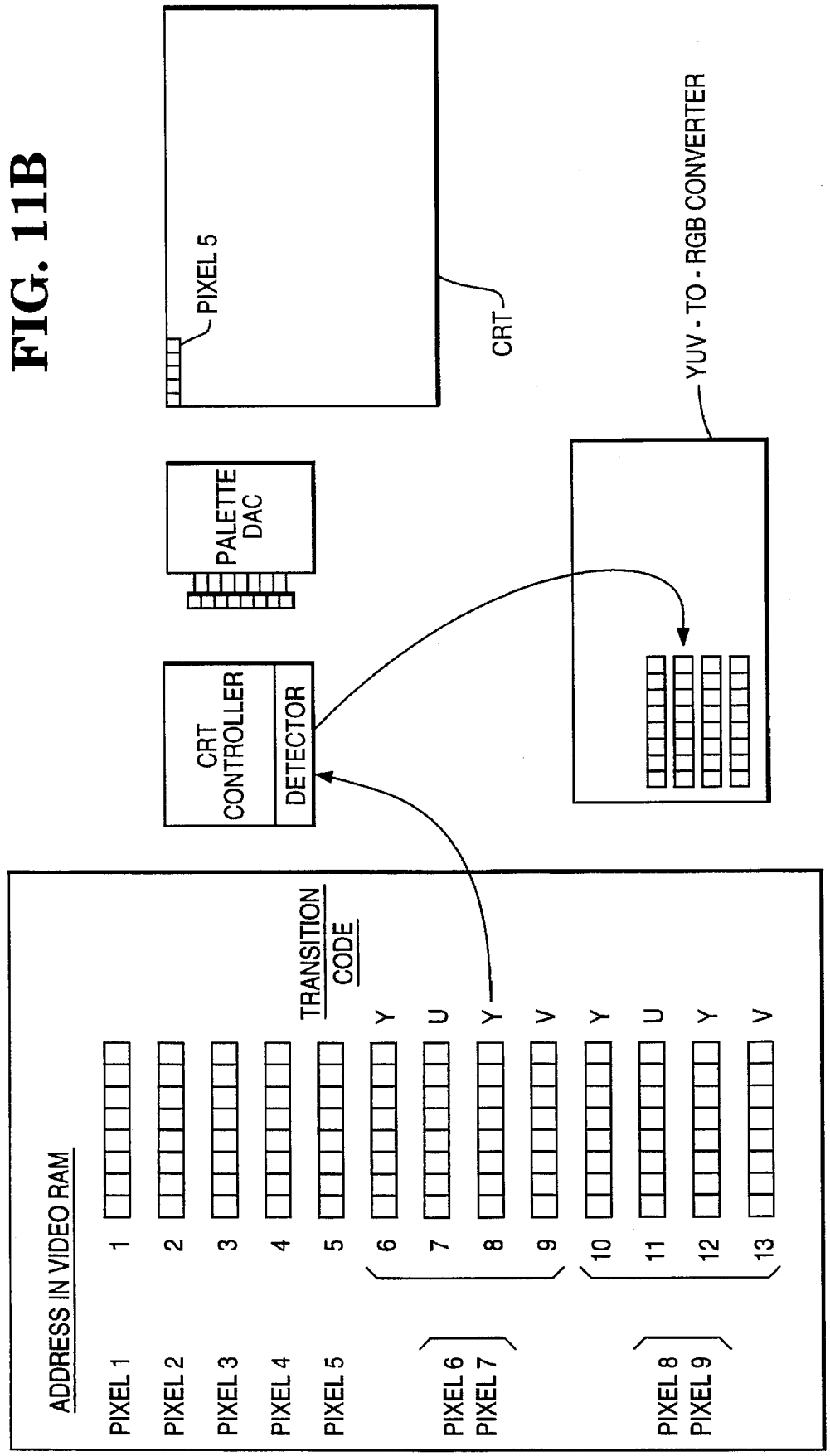
Figure 12A:
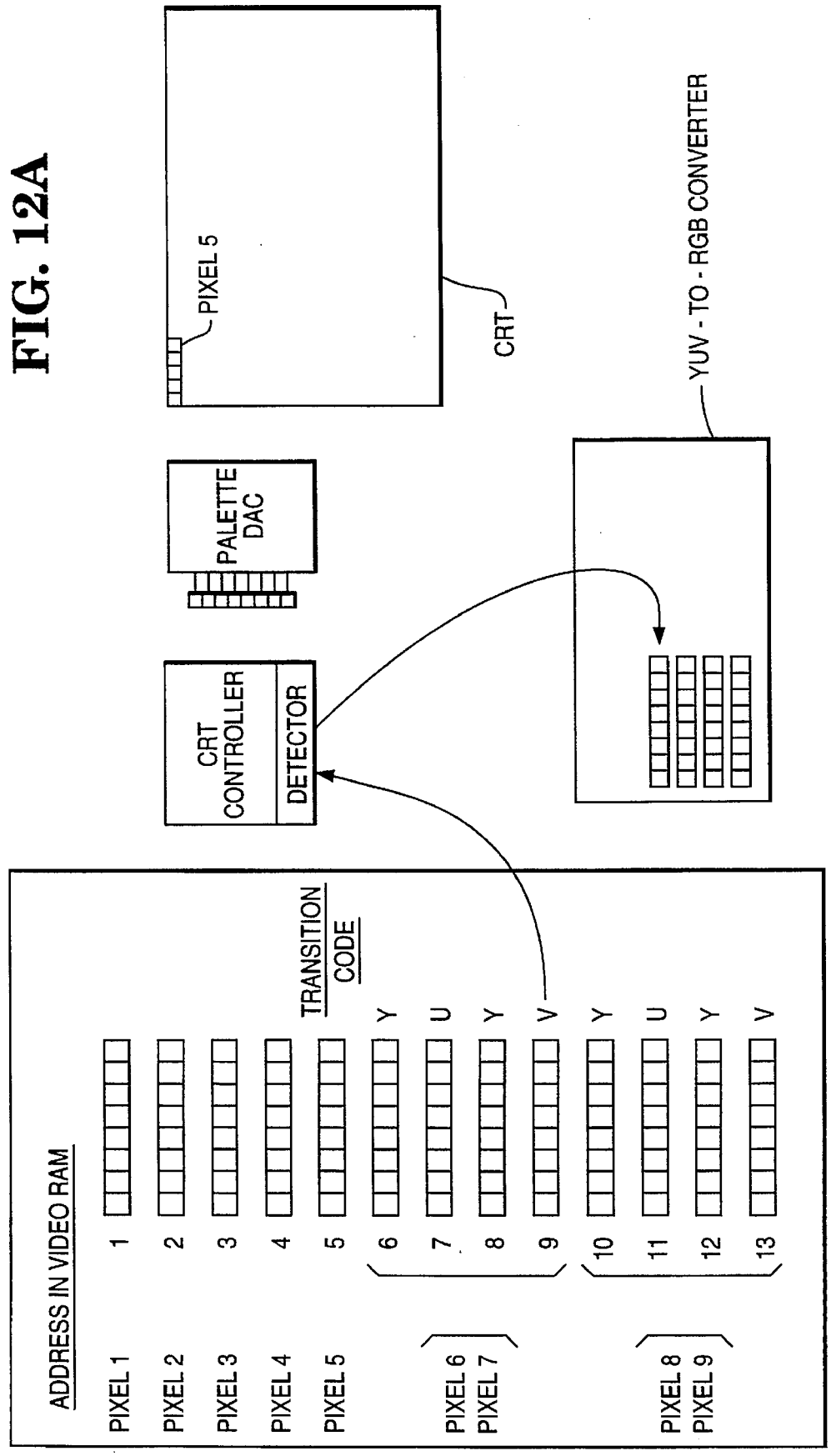

Assume that the CRT in FIG. 8 is to contain a window in which an animated cartoon is to be played, based on YUV data obtained from a CD-ROM. The rest of the display is based on normal RGB data. A simplified view of the invention is the following.

Figure 1A:
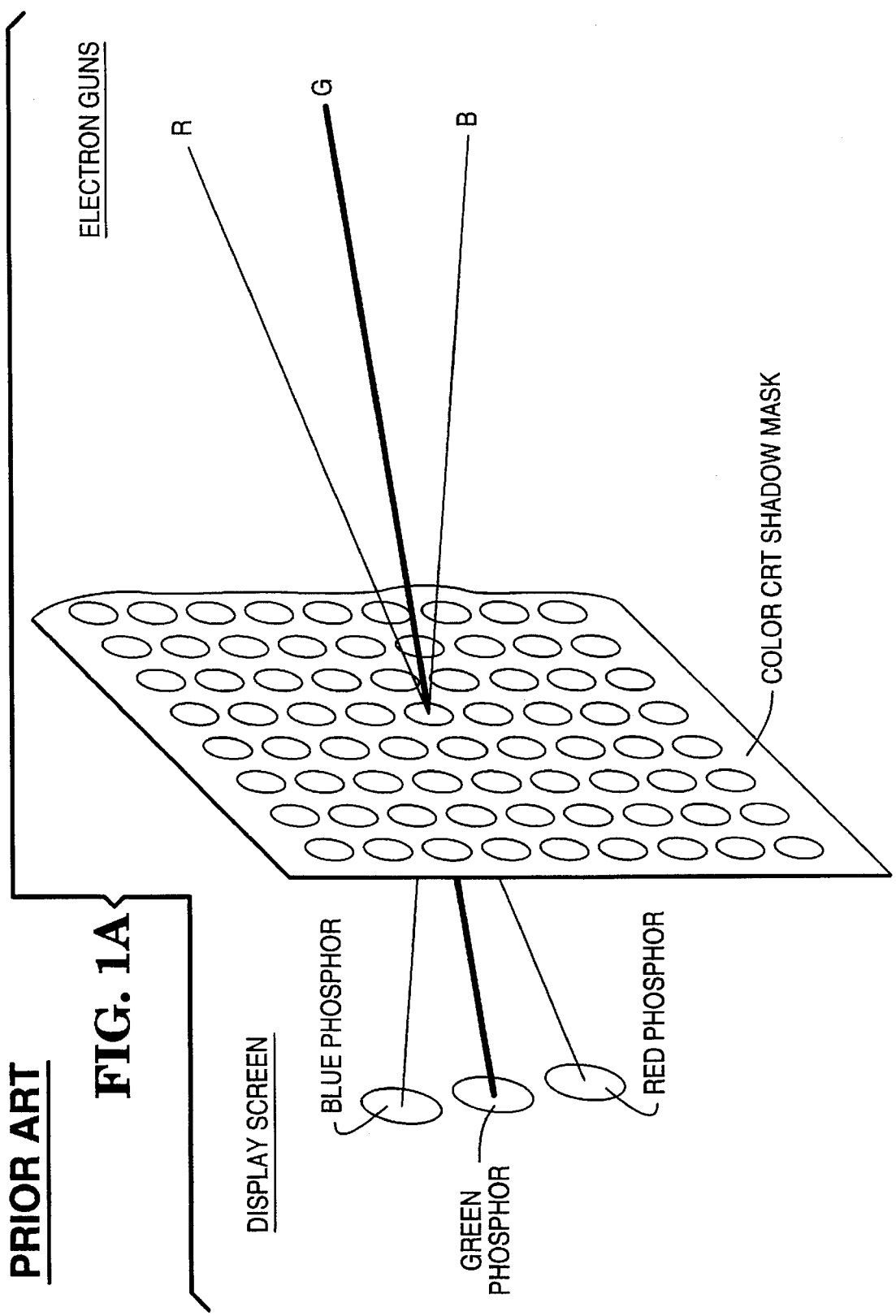
Figure 3A:
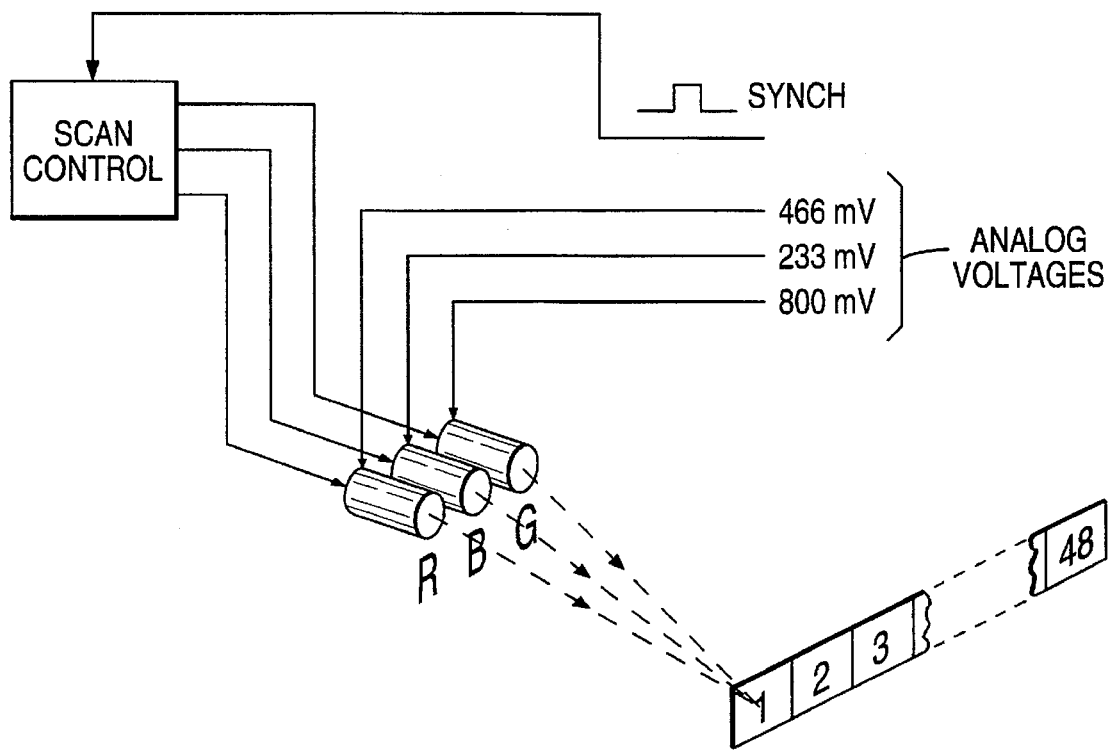
FIG. 3 illustrates how three ANALOG VOLTAGEs are applied to the electron guns for each pixel.
Figure 3B:
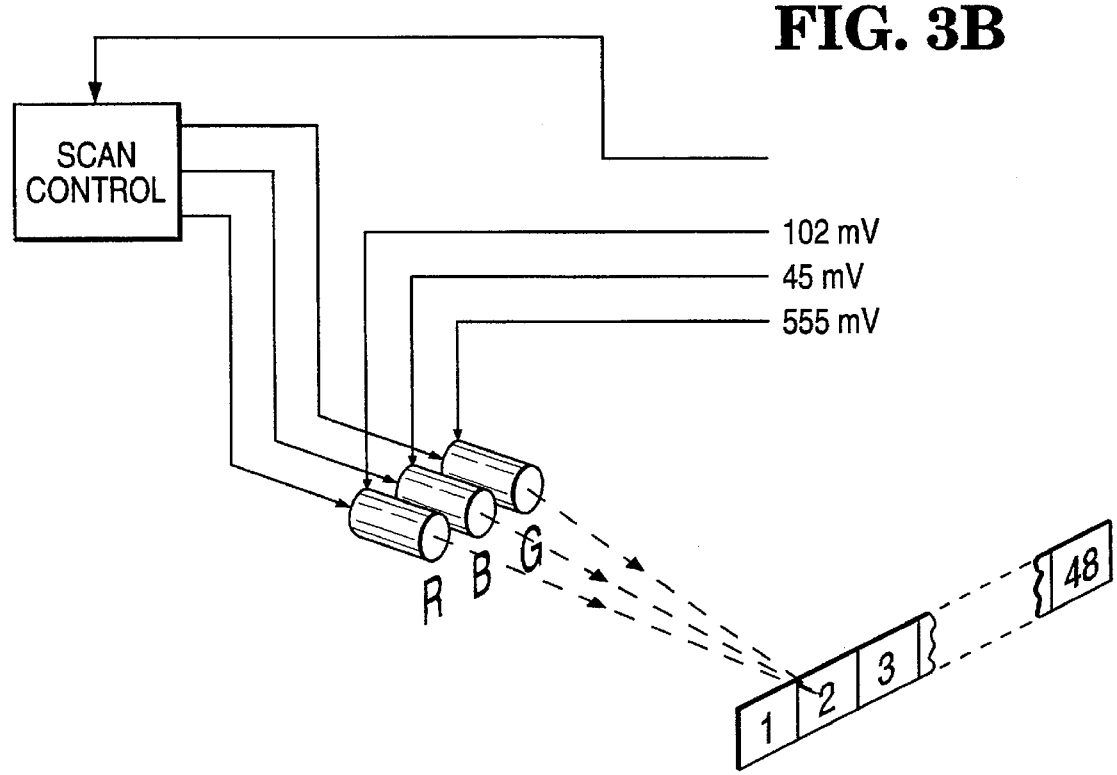
Figure 3C:
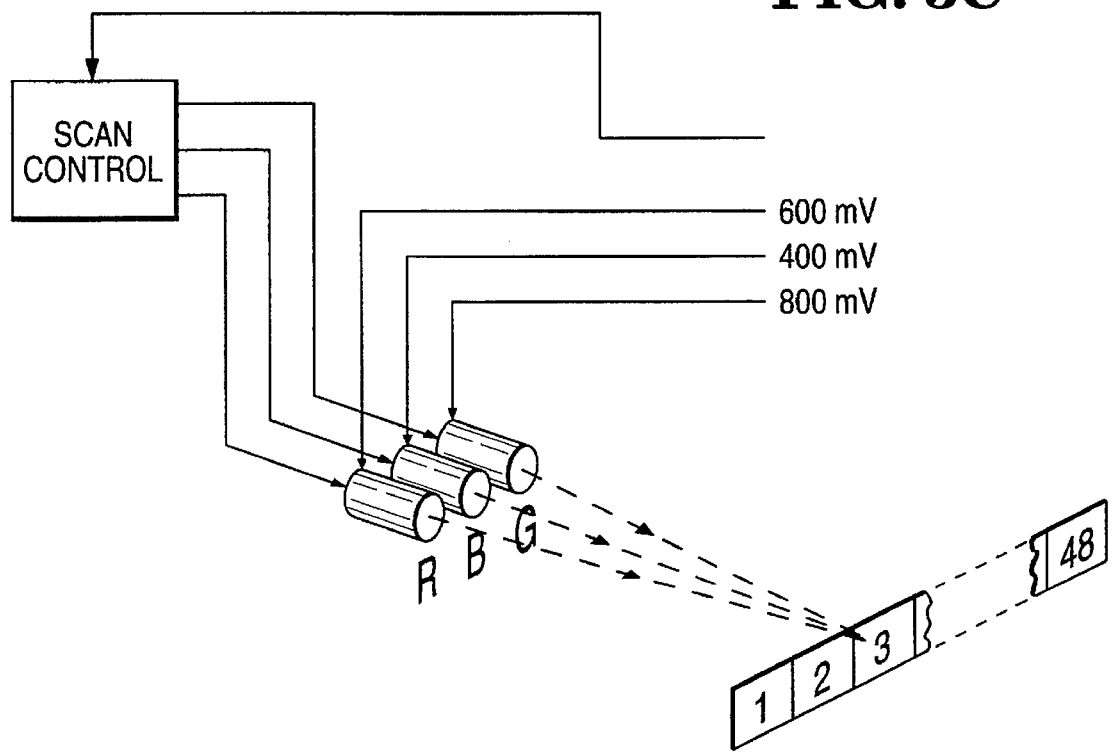
Figure 3D:
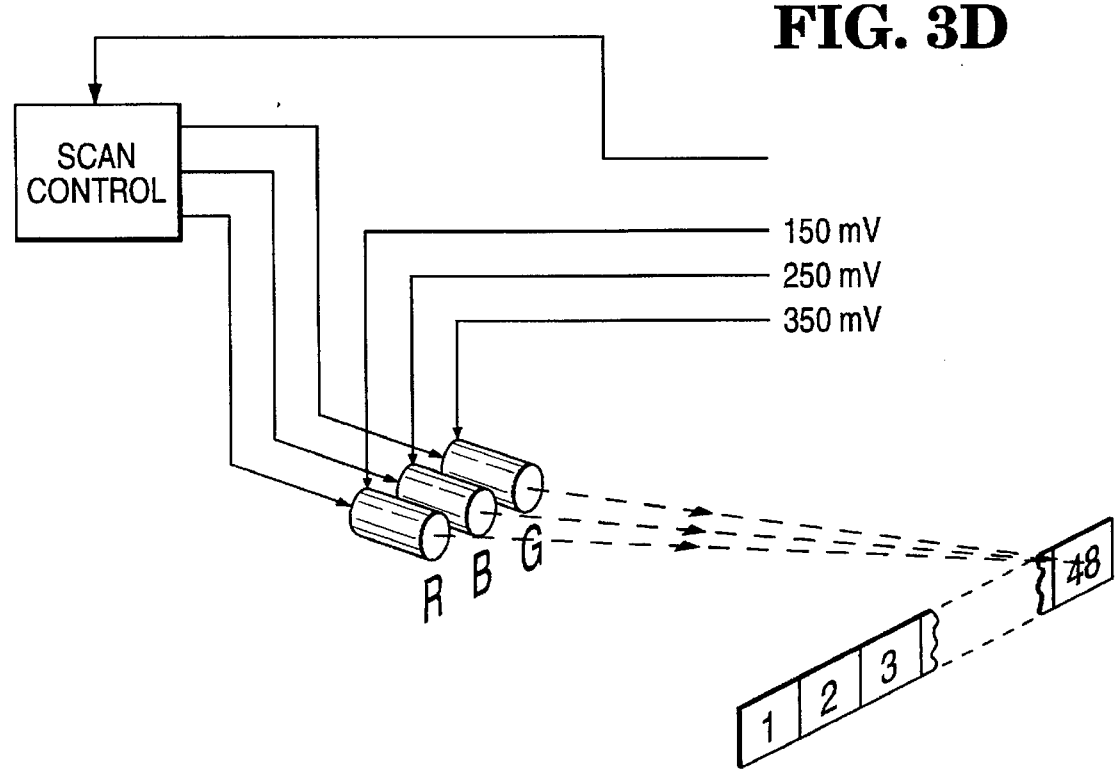
Figure 6:
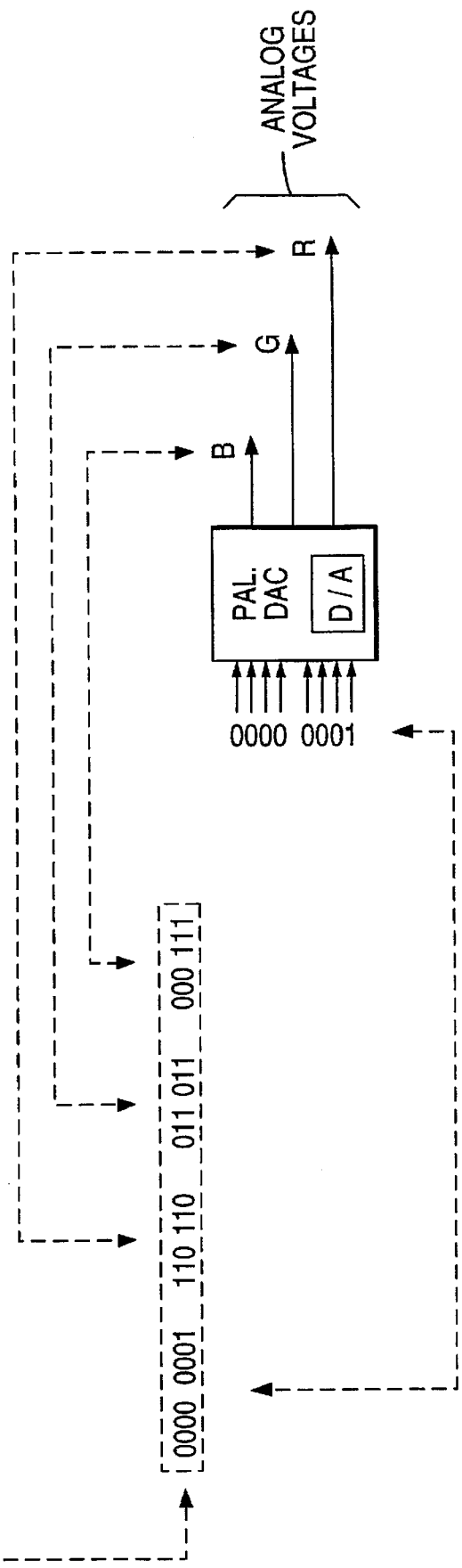
FIG. 6 is a schematic of the operation of the PALETTE DAC.
Figure 7:
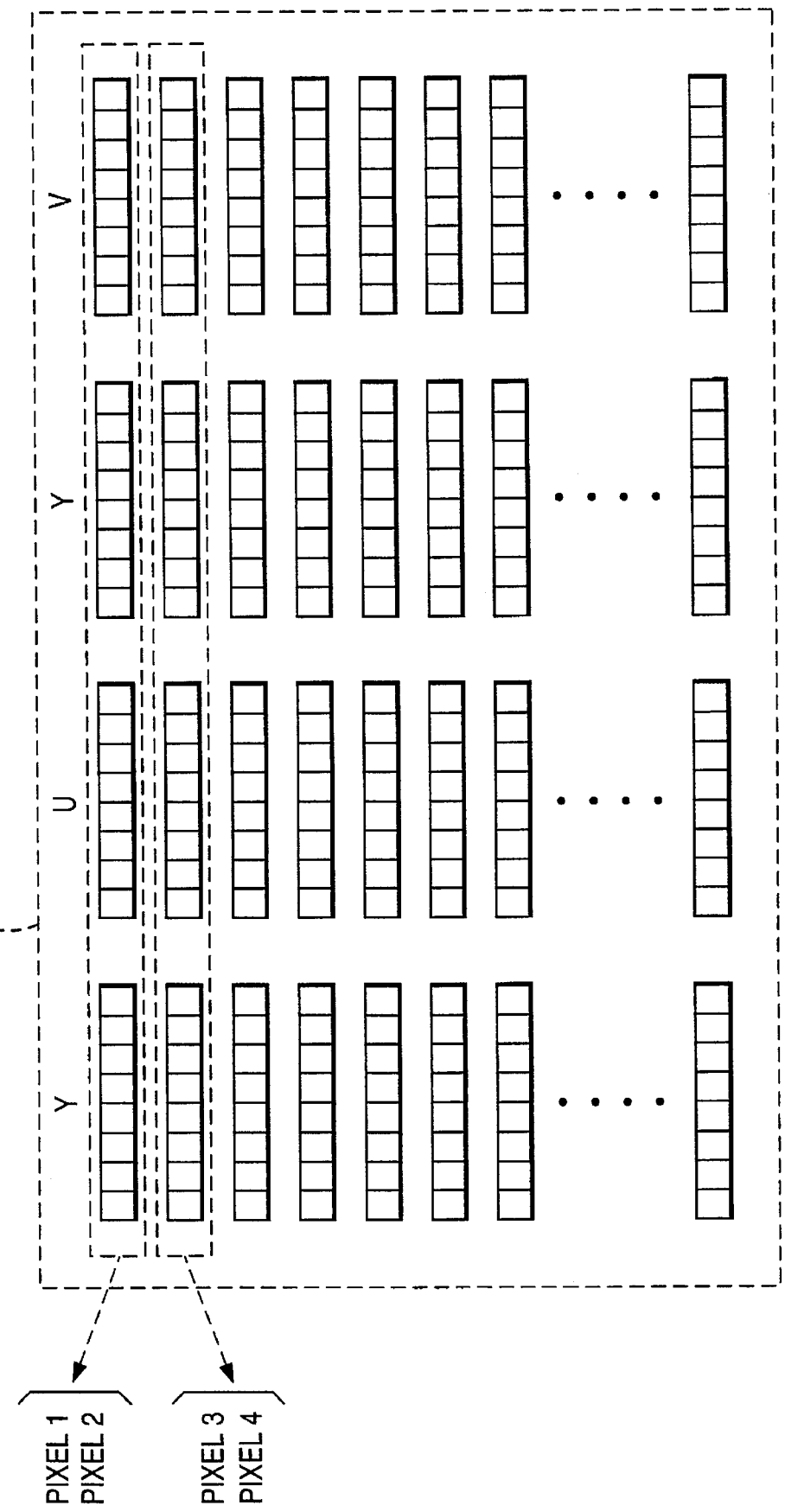
FIG. 7 illustrates how YUV data requires four bytes per pixel.

The invention placed the YUV data into DISPLAY MEMORY. Now, the DISPLAY MEMORY contains both RGB and YUV data. The RGB data occupies one DISPLAY MEMORY address per CRT pixel. The YUV data occupies four DISPLAY MEMORY addresses per two CRT pixels (as indicated in FIG. 7). A unique TRANSITION CODE, in FIG. 8, is placed in DISPLAY MEMORY at the location where RGB data changes to YUV data.

As the invention reads DISPLAY MEMORY, it examines each byte. When a TRANSITION CODE is detected, the TRANSITION CODE itself is treated as RGB data, and the corresponding pixel is illuminated according to the eighteen-bit word which the PALETTE DAC provides for this TRANSITION CODE.

That is, the TRANSITION CODE is a normal eight-bit word stored in DISPLAY MEMORY, but is only used for marking transitions between data in different formats. It is not used for displaying other images. When it is displayed, it forms a frame, or border, around the YUV data.

Detection of the TRANSITION CODE also triggers other circuitry into operation, which converts the four-byte YUV data into two bytes of RGB data for two adjacent pixels. The resulting RGB data is fed to the PALETTE DAC in the usual manner. An example will illustrate.

EXAMPLE

FIG. 8 illustrates how DISPLAY MEMORY is arranged. Addresses 1 through 5, corresponding to PIXELs 1 through 5, contain RGB data. Each address contain one byte of RGB data.

In contrast, PIXELs 6 and 7 are based on YUV data. Each "YUV-pixel" requires two bytes of data. Consequently, four addresses in DISPLAY MEMORY are allocated to each pair of adjacent pixels. Addresses 6 through 9 are allocated to PIXELs 6 and 7, addresses 10 through 12 are allocated to pixels 8 and 9.

FIGS. 9–13 illustrate reading of this data, and generation of pixels. Under the invention, a DETECTOR is associated with the CRT CONTROLLER. The DETECTOR examines each byte read from DISPLAY MEMORY, and inquires whether the byte is a TRANSITION CODE. If not, the byte is delivered to the PALETTE DAC, as described in the Background. FIGS. 9A, 9B, and 10A illustrate generation of PIXELs 1 through 5.

When DISPLAY MEMORY address 5 is reached, however, a TRANSITION CODE is detected. Two events occur. One, the byte is sent to the PALETTE DAC, as above, as indicated in FIG. 10A. The Palette DAC generates a pixel color which is unique, which is not used for other purposes, and which forms part of a border surrounding the YUV image (later to be formed).

Two, the DETECTOR triggers a system into operation which treats subsequent bytes in DISPLAY MEMORY as YUV data, and translates each quadruplet of bytes into a pair of RGB bytes which the PALETTE DAC can understand. The RGB bytes are fed to the PALETTE DAC.

FIGS. 10B–12B illustrate the sequence of operation. First, the YUV-to-RGB CONVERTER is loaded with four bytes, as indicated in FIGS. 10B, 11A, 11B, and 12A. With the four bytes loaded, the YUV-to-RGB TRANSLATOR can generate RGB bytes which the PALETTE DAC can understand. The RGB bytes are delivered to the PALETTE DAC, as in FIG. 12B, which produces PIXELs 6 and then 7.

The YUV-to_RGB translation continues until a second TRANSITION CODE is detected. This code is a unique byte which is only used to de-activate the YUV-to-RGB CONVERTER.

Additional Considerations

1. It is not necessary that the YUV data be located in the memory space ascribed to DISPLAY MEMORY. It can be located elsewhere. The invention knows the location, and loads the YUV-to-RGB CONVERTER, four bytes at a time, from the location, when a TRANSITION CODE is detected.

2. YUV data contains four bytes per two pixels. Preferably, a specific one of these bytes, such as the last one, is a TRANSITION CODE, when a transition is called for. When this TRANSITION CODE is detected, the invention translates the four YUV bytes into a pair of RGB bytes, in the normal manner. However, in addition, the invention causes subsequent bytes read from DISPLAY MEMORY to be treated as RGB data. The YUV-to-RGB TRANSLATOR now becomes deactivated.

3. The discussion above assumed two types of TRANSITION CODES: one which initiates YUV-to-RGB translation, and one which terminates YUV-to-RGB translation. However, more than two codes can be used. Translation from multiple data formats are possible, each being initiated and terminated by its own respective TRANSITION CODEs.

4. There are numerous particular ways of responding when a TRANSITION CODE is detected. The discussion above assumed that, when a TRANSITION CODE is detected while reading RGB data from DISPLAY MEMORY, the TRANSITION CODE is treated as RGB data, and is fed to the PALETTE DAC as such. This need not be the case: separate circuitry can be actuated to feed different, specific data to the PALETTE DAC when a TRANSITION CODE is detected.

Similarly, the discussion above assumed that, when a TRANSITION CODE is detected while reading YUV data, the YUV data in which the TRANSITION CODE is embedded is treated as normal YUV data, which is converted to RGB data, and fed to the PALETTE DAC as such. However, this need not be the case: separate circuitry can be actuated to feed specific data to the PALETTE DAC when a TRANSITION CODE is detected which is embedded in YUV data.

5. The ANALOG VOLTAGES can be viewed as CRT input. However, the CRT input need not be analog in nature. The function of the PALETTE DAC can be assumed by apparatus located within the CRT itself. Thus, the invention supplies either (a) an RGB code read from DISPLAY MEMORY, or (b) an RGB code derived from translation of YUV data. In either case, the CRT input can be digital in form, rather than analog.

6. CRT displays were assumed in the discussion above. However, other types can be used, such as LCD, and LED.

7. In the examples given above, the RGB data is stored as one byte per pixel. The YUV data is stored as four bytes per two pixels. Consequently, the RGB data can be termed "low overhead data" because fewer memory locations are required per pixel. The YUV data is "high overhead data."

In general, there are different formats with different overhead values. If the RGB data were stored as three bytes per pixel, and the YUV data as four bytes per pair of pixels, then the RGB data would become the "high overhead data." The invention switches from one type of overhead data to another when a TRANSITION CODE is read.

Figure 13:
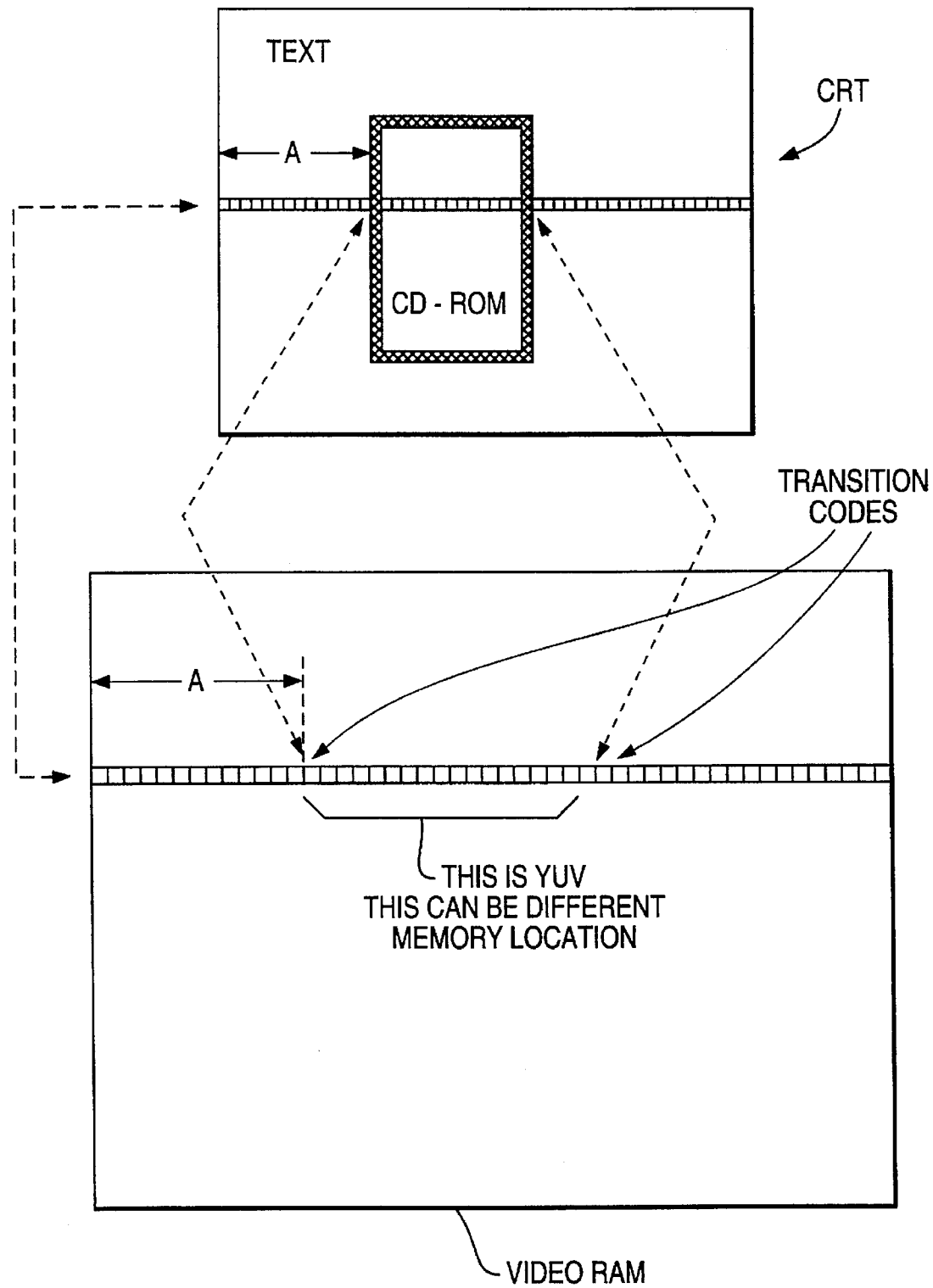
FIG. 13 illustrates the events which occur during the scanning of a single row of pixels.

8. FIG. 13 illustrates the events which occur during the scanning of a single row of pixels. First, in region A, the data located in DISPLAY MEMORY is converted by the PALETTE DAC. Next, a TRANSITION CODE is detected. Now, video data is obtained either from a different location, or in a different format, or both. The video data, nevertheless, must be made compatible with the input which the PALETTE DAC expects. In the examples given above, the YUV-to-RGB CONVERTER generated this compatibility.

Next, a second TRANSITION CODE is detected. Now, video data is again obtained from the DISPLAY MEMORY.

9. In FIGS. 9–12, the analog signals produced by the PALETTE DAC, based on the data in VIDEO RAM at locations 1 through 4, can be termed "RGB-based analog signals." The analog signals are based on RGB data located in the VIDEO RAM.

The analog signals produced by (a) the YUV-to-RGB CONVERTER, together (b) with the PALETTE DAC, based on the data in VIDEO RAM at locations 6 through 9, can be termed "YUV-based analog signals." They are based on YUV data located in the VIDEO RAM.

However, because the YUV data takes longer to process (it requires at least the steps of FIGS. 10B, 11A, 11B, and 12A), no pixel generation occurs during these Figures. To compensate, the preceding RGB-based pixels (for pixels 1 through 5) are delayed while en route to the CRT. For example, the RGB-based pixels can be clocked through a shift register to create a delay. With the delay, the RGB-based data becomes pipelined. Pixel 1 (FIG. 9A) is not generated until FIG. 10B; Pixel 2 is not generated until FIG. 11A; Pixel 5 is not generated until FIG. 12A. Now, Pixels 6 and 7 (which are based on YUV-based data) there are produced without delay.

Restated, Pixel 1 is not displayed until after a delay sufficient to compensate for the delay occurring between the display of Pixel 5 and Pixel 6.

Numerous substitutions and modifications can be undertaken without departing from the true spirit and scope of the invention. What is desired to be secured by Letters Patent is the Invention as defined in the following claims.

I claim:

1. In the process of storing data into a display memory in a computer, the improvement comprising the following step:

storing a unique code in the display memory between data of a first type corresponding with at least one video display pixel and successive data of a second type corresponding with a plurality of video display pixels, said unique code marking a transition point wherein video data stored in the display memory changes from a first display image format to a second display image format and wherein said successive data is for use to generate said plurality of video display pixels according to said second display image format.

2. In a video display system, which translates data stored in a display memory into a video image, said data comprising a plurality of data types which represent dissimilar display image formats, the improvement comprising the step of:

changing to a different method of stored data translation when a predetermined code word is detected between data of a first type corresponding with at least one video display pixel and successive data of a second type corresponding with a plurality of video display pixels in the display memory, wherein said successive data is for translation to generate said plurality of video display pixels according to a display image format corresponding with said second data type.

3. In a computer having a video controller which provides CRT input to a display, based on video data contained in a display memory, the improvement comprising:

(a) a transition code between low-overhead data corresponding with at least one video display pixel, and successive high-overhead data corresponding with a plurality of video display pixels in the display memory;

(b) means for reading the display memory and for detecting the transition code;

(c) means for translating high-overhead data into low-overhead data;

(d) means for activating said means for translating high-overhead data when the means for reading detects the transition code, so that said successive high-overhead data read from the display memory subsequent to the detection of the transition code is translated into low-overhead data, wherein said successive high-overhead data is for use to generate said plurality of video display pixels according to a corresponding display image format, said high-overhead data comprising a greater number of bytes per pixel than said low-overhead data; and (e) means for translating said low-overhead data into CRT input.

4. A method of operating a video controller, which provides CRT input to a CRT, comprising the following steps:

(a) reading data from a display memory, said data comprising a plurality of data types which represent dissimilar display image formats;

(b) deriving CRT input, corresponding with at least one video display pixel, in a first manner associated with a first display image format, using the data read; and (c) monitoring the data read and, when a predetermined data word is detected, deriving CRT input in a second manner associated with a second display image format for successive data, corresponding with a plurality of video display pixels, read from said display memory after said predetermined data word is detected, wherein said successive data is for use to generate said plurality of video display pixels according to said second display image format.

5. A method of controlling a video display, comprising the following steps:
   (a) reading video data from a video memory, said video data comprising a plurality of data types which represent dissimilar display image formats; and
   (b) monitoring the video data, and, when a predetermined data type occurs, translating subsequent successive video data, corresponding with a plurality of video display pixels, from the video memory into a different display image format, wherein said successive video data is for use to generate said plurality of video display pixels according to said different display image format.

6. A method of generating a video image in a computer, comprising the following steps:
   (a) embedding a transition code within a display memory, said transition code indicating a transition from one type of data to another type of data;
   (b) reading data from said display memory;
   (c) generating pixels based on said data read from said display memory;
   (d) detecting the occurrence of said transition code in said data read from said display memory;
   (e) generating a pixel using said transition code; and
   (f) generating subsequent pixels based on data outside said display memory wherein said pixel generated using said transition code is between said pixels generated based on data from said display memory and said pixels generated based on data outside said display memory.

7. A process for generating multiple image types on a computer display, comprising the steps of:
   storing at least one data word having a first data format in a display memory, said at least one data word to be used to create at least one pixel of a first type on said computer display;
   storing a transition code word in a location in said display memory after said at least one data word;
   storing successive data words having a second data format in a location in said display memory after said transition code word, said successive data words to be used to create a plurality of pixels of a second type on said computer display;
   using said transition code word as an indicator, while reading from said display memory, that the data words being read are transitioning in data format; and
   processing said data words read from said display memory according to data format to create images of multiple types on said computer display.

* * * * *